United States Patent
Lin et al.

(10) Patent No.: US 7,288,142 B2
(45) Date of Patent: Oct. 30, 2007

(54) BLACK DYES COMPOSITION FOR INK-JET INKS

(75) Inventors: Jen-Fang Lin, Taoyuan County (TW); Chien-Wen Lee, Taoyuan County (TW); Tzu-Kwei Sun, Taoyuan County (TW); Tsung-Wen Huang, Taoyuan County (TW)

(73) Assignee: Everlight USA, Inc., Pineville, NC (US)

( * ) Notice: Subject to any disclaimer, the term of this patent is extended or adjusted under 35 U.S.C. 154(b) by 158 days.

(21) Appl. No.: 11/213,858

(22) Filed: Aug. 30, 2005

(65) Prior Publication Data

US 2006/0174800 A1    Aug. 10, 2006

(30) Foreign Application Priority Data

Feb. 5, 2005    (CN) .................. 2005 1 0069008

(51) Int. Cl.
*C09D 11/02* (2006.01)
*C09B 67/00* (2006.01)
*C09B 67/24* (2006.01)

(52) U.S. Cl. ............... 106/31.51; 106/31.52; 106/31.58; 106/31.59; 106/31.49; 8/549; 8/639; 8/641

(58) Field of Classification Search ............. 106/31.51, 106/31.52, 31.58, 31.59, 31.49; 8/549, 639, 8/641
See application file for complete search history.

(56) References Cited

U.S. PATENT DOCUMENTS

| | | | |
|---|---|---|---|
| 4,694,302 A | 9/1987 | Hackleman et al. | 106/31.58 |
| 5,062,892 A | 11/1991 | Halko | 106/31.58 |
| 5,445,654 A * | 8/1995 | Hussong et al. | 8/546 |
| 5,611,821 A * | 3/1997 | Huang et al. | 8/549 |
| 5,725,641 A | 3/1998 | MacLeod | 106/31.5 |
| 5,951,717 A * | 9/1999 | Mrotzeck et al. | 8/149.1 |
| 6,036,732 A * | 3/2000 | Pedemonte et al. | 8/549 |
| 6,126,700 A * | 10/2000 | Bao-Kun et al. | 8/549 |
| 6,159,251 A * | 12/2000 | Pedemonte et al. | 8/639 |
| 6,171,349 B1 * | 1/2001 | Lai et al. | 8/549 |
| 6,464,734 B1 * | 10/2002 | Steckelberg et al. | 8/549 |
| 6,585,782 B2 * | 7/2003 | Huang et al. | 8/549 |
| 6,712,863 B2 * | 3/2004 | Steckelberg et al. | 8/549 |
| 6,780,204 B2 * | 8/2004 | Lai et al. | 8/549 |
| 7,015,335 B2 * | 3/2006 | Dannheim | 549/8 |
| 2007/0050926 A1 * | 3/2007 | Lin et al. | 8/568 |

FOREIGN PATENT DOCUMENTS

DE    1 302 519    1/1973
JP    45-40182    12/1970

* cited by examiner

*Primary Examiner*—Helene Klemanski
(74) *Attorney, Agent, or Firm*—Bacon & Thomas PLLC

(57) ABSTRACT

The present invention relates to a black dyes composition for ink-jet printing ink comprising (A) a compound of the following formula (I)

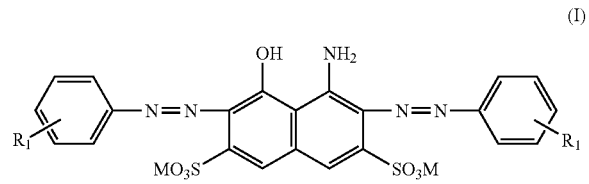

wherein, $R_1$ is $-SO_2CH_2CH_2OSO_3H$ or $-SO_2CH=CH_2$ or $-SO_2CH_2CH_2OH$; M is H, Na or Li; (B) a compound of the following formula (II)

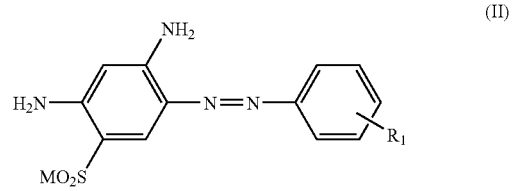

wherein, $R_1$ is $-SO_2CH_2CH_2OSO_3H$ or $-SO_2CH=CH_2$ or $-SO_2CH_2CH_2OH$; M is H, Na or Li; and (C) a compound of the following formula (III)

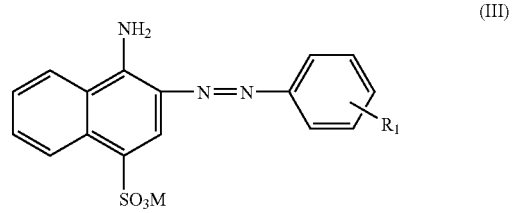

wherein, $R_1$ is $-SO_2CH_2CH_2OSO_3H$ or $-SO_2CH=CH_2$ or $-SO_2CH_2CH_2OH$; M is H, Na or Li; these compositions are particularly suitable for using in paper inkjet printing ink, and inkjet printing inks with good light-fastness and solubility are obtained.

11 Claims, No Drawings

BLACK DYES COMPOSITION FOR INK-JET INKS

BACKGROUND OF THE INVENTION

1. Field of the Invention

The present invention generally relates to ink jet printing, and particularly to a class of black dyes composition for improving ink-jet light-fastness.

2. Description of the Related Prior Art

Ink jet printing is a non-impact printing method, the involving features include and provide sharp, non feathering patterns, as well consist of good water-fastness, light-fastness, and optical density. Properties such as fast drying and fine storage stability, fine fluency of ink flow, and non-clogging are also included.

Examples of the reactive dyestuffs used: When C.I. Reactive Red 180 or C.I. Reactive Black 31 from the publicized Color Index are used as the dye components of the inkjet printing ink, with time the reactive groups undergo hydrolysis, which then results in an increase amount of salts in the ink as hydrolysis proceeds, the consequences of are clogging at the nozzle or variability of the hue of the ink and others.

In the U.S. Pat. No. 4,694,302 and U.S. Pat. No. 5,062,892, the commonly used black ink dye composition such as C.I. Food Black 2 is disclosed, where the light-fastness and other properties are poor and the above printing required is not satisfied; and even though the C.I. Direct Black 168 consists of good light-fastness but it has low solubility, so that the use as the inkjet ink dye components is constrained.

As a result, the effort for a dye composition of the ink-jet printing ink with good light-fastness, wide area of color space, good solubility and fine fluency of ink flow is a direction to keep working with.

SUMMARY OF THE INVENTION

The present invention relates to a black dyes composition for ink-jet inks, particularly to black-dyes suitable for the use with paper inkjet printing, while good light-fastness and solubility of the ink composition are exhibited.

The compositions of the present invention comprising:

(A) a compound of the following formula (I)

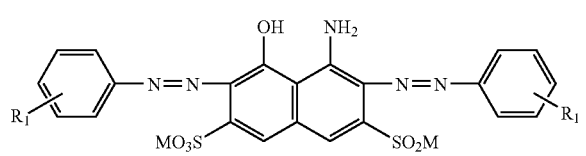

wherein $R_1$ is —$SO_2CH_2CH_2OSO_3H$ or —$SO_2CH=CH_2$ or —$SO_2CH_2CH_2OH$; M is H, Na, or Li; preferably $R_1$ is —$SO_2CH=CH_2$ or —$SO_2CH_2CH_2OH$;

(B) a compound of the following formula (II)

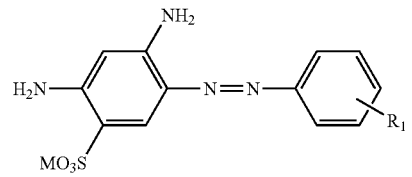

wherein $R_1$ is —$SO_2CH_2CH_2OSO_3H$ or —$SO_2CH=CH_2$ or —$SO_2CH_2CH_2OH$; M is H, Na, or Li; preferably $R_1$ is —$SO_2CH=CH_2$ or $SO_2CH_2CH_2OH$; and (C) a compound of the following formula (III)

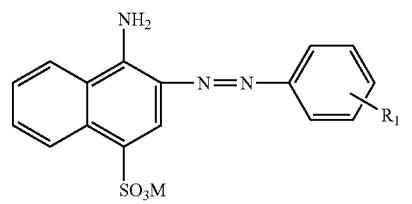

wherein, $R_1$ is —$SO_2CH_2CH_2OSO_3H$ or —$SO_2CH=CH_2$ or $SO_2CH_2CH_2OH$; M is H, Na or Li. Preferably $R_1$ is —$SO_2CH=CH_2$ or $SO_2CH_2CH_2OH$.

The compound of formula (I) of the present invention, preferably it is the following formula (I-1):

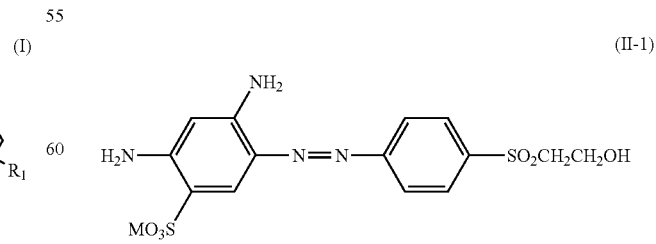

wherein M is H, Na, or Li. Preferably M of the formula (I-1) is Li.

The compound of formula (II) of the present invention composition, preferably it is the following formula (II-1):

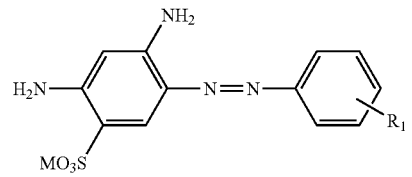

wherein M is H, Na, or Li. Preferably M of the formula (II-1) is Li.

The compound of formula (III) of the present invention composition, preferably it is the following formula (III-1):

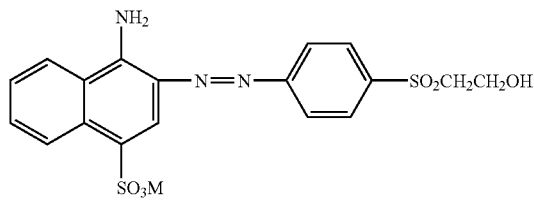
(III-1)

wherein M is H, Na or Li. Preferably M of the formula (III-1) is Li.

Each component ratio of the present invention composition preferably the formula (I) is present in an amount of 50% to 94% by weight relative to total weight of said composition; the formula (II) is present in an amount of 3% to 47% by weight relative to total weight of said composition; and the formula (III) is present in an amount of 3% to 30% by weight relative to total weight of said composition.

Besides the components (A), (B), and (C), the compositions of the present invention further comprising component (D) organic solvent, the organic solvent is selected from the groups consisting of ethylene glycol, diethylene glycol, triethylene glycol, propylene glycol, butylenes glycol, ethylene glycol monoethyl ether, ethylene glycol monobutyl ether, diethylene glycol monomethyl ether, 2-pyrrolidone, N-methyl-2-pyrrolidone, 1,3-dimethyl-2-imidazolidinone, and triethanolamine.

Besides the components (A), (B), (C), and (D), the compositions of the present invention further comprising component (E) surfactant, the surfactant is an acetylene glycol derivative, and can be selected from the group consisting of trade name products such as—Surfynol 465, Surfynol 485, Surfynol 420, and Surfynol 104 (distributed by Air Products & Chemicals, Inc.), the general formula of the chemical structure is the following formula:

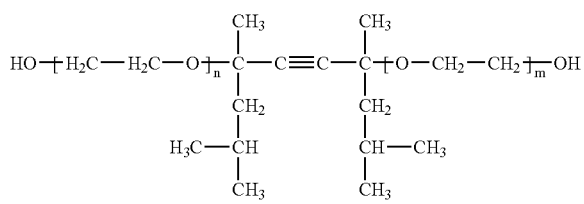

wherein the sum of n and m is and integer between 0 to 50.

DETAILED DESCRIPTION OF THE PREFERRED EMBODIMENT

Take 70 parts dyestuff of formula (I), 15 parts dyestuff of formula (II), and 15 parts dyestuff of formula (III) of the present invention composition, and then mixed together completely to form a dye composition of the examples; the specific structures and sources of the formulas (I), (II), and (III) of the present invention composition are exemplified as follow, and will not be limited to the following descriptive examples:

An example of the specific structure of the compound of formula (I) of the present invention composition is C.I. Reactive Black 5

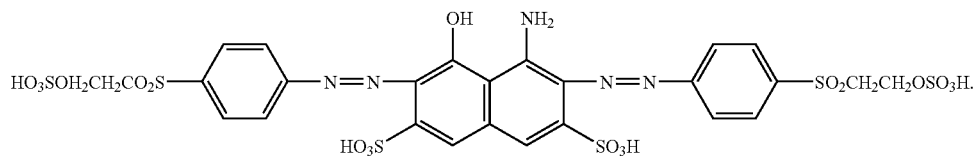
(I-3)

It can be obtained from the marketed black reactive dyestuff, and trade names such as Everzol Black B may be used.

Example of the specific structure of the compound of formula (II) of the present invention composition is:

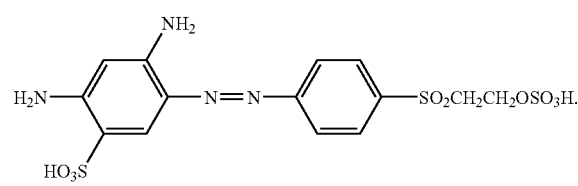
(II-3)

The preparation of is disclosed in German Patent No. DE1911427 and can be referenced.

Example of the specific structure of the compound of formula (III) of the present invention composition is:

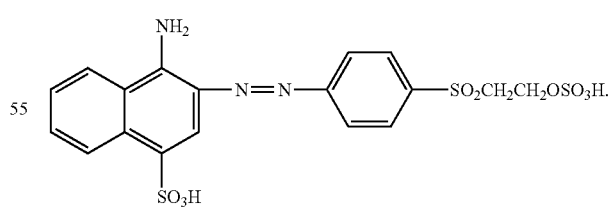
(III-3)

The preparation of it disclosed and may be referenced in the Japanese Patent Official Gazette No. 45-40182.

The component ratio of formula (I), (II), and (III) of the present invention composition is not critical; generally the smallest relative weight percentage of each component ratio is 3%, and the largest relative weight percentage of each component ratio is 95%.

Each component ratio of the present invention composition preferably the formula (I) is present in an amount of 50% to 94% by weight relative to total weight of said composition; the formula (II) is present in an amount of 3% to 47% by weight relative to total weight of said composition; and the formula (III) is present in an amount of 3% to 30% by weight relative to total weight of said composition.

Examples of feasible buffers are acetic acid, acetate, phosphoric acid, phosphate, borax, borate, or citrate. Examples of feasible anti-bacterial agents are NUOSEPT (distributed by Nudex Inc., a division of Huls America1), UCARCIDE (distributed by Union Carbide), VANCIDE (distributed by RT Vanderbilt Co.) and PROXEL (distributed by ICI Americas); the aforementioned components may be referenced in the disclosed Taiwan Patent No. 589,352 or U.S. Pat. No. 5,725,641.

The specific preparations of compounds (I), (II), (III) of the present invention are exemplified below, and will not be limited to the following examples.

Dyestuff Preparation Example 1

To 30 kg of dyestuff of formula (I-3), 500 ml of 45% sodium hydroxide aqueous solution are used to adjust the pH value to 9~10, and at a controlled temperature range of 25~30° C. hydrolysis is proceeded for 60 minutes. Subsequently 30 ml of 32% hydrochloric acid solution are applied to adjust the pH value to 7~7.5, and by performing reverse osmosis desalination approximately 30% of the lithium salt are replaced, it is then spray dried to obtain the following powdered lithium salt of formula (I-2) of the present invention.

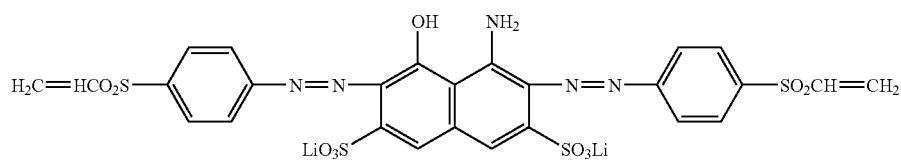

(I-2)

Dyestuff Preparation Example 2

The dyestuff of formula (II-3) is substituted for the dyestuff of formula (I-3) with the repetition of the aforementioned dyestuff example 1 procedures to obtain the following powdered lithium (II-2) of the present invention.

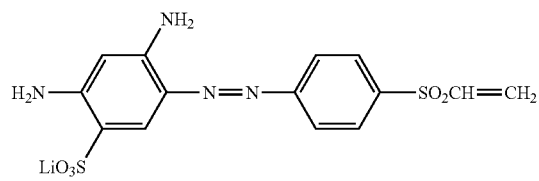

(II-2)

Dyestuff Preparation Example 3

The dyestuff of formula (III-3) is substituted for the dyestuff of formula (I-3) with the repetition of the aforementioned dyestuff example 1 procedures to obtain the following powdered lithium (III-2) of the present invention.

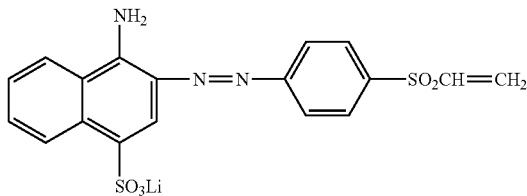

(III-2)

Dyestuff Preparation Example 4

Take 2 kg of powdered dye compound of formula (I-2) and dissolving it in 18 kg of water, and with the addition of hydrochloric acid solution the pH value is adjusted to 7~7.5. Follow up the solution undergoes reverse osmosis desalination to replace approximately 30% of the lithium salt, and then it is spray dried to obtain the following powdered lithium salt of formula (I-1) of the present invention.

Dyestuff Preparation Example 5

The dyestuff of formula (II-2) is substituted for the dyestuff of formula (I-2) with the repetition of the aforementioned dyestuff example 4 procedures to obtain the following powdered lithium (II-1) of the present invention.

Dyestuff Preparation Example 6

The dyestuff of formula (III-2) is substituted for the dyestuff of formula (I-2) with the repetition of the aforementioned dyestuff example 4 procedures to obtain the following powdered lithium (III-1) of the present invention.

The aforementioned obtained dye compounds from the examples are mixed with an ink carrier to obtain the ink composition. Comparing to the general marketed black ink composition such as Bayscrip Black SP from Bayer and Duasyn Direct Black HEF-SF from Clariant, the printing properties, testing methods and data for light-fastness are exemplified in the following ink examples.

Example 1

Compositions of the Present Invention

Respectively, 70 parts dyestuff of formula (I-1), 15 parts dyestuff of formula (II-1), and 15 parts dyestuff of formula (III-1) are mixed together in a beaker, which are then stirred with a stirrer for 30 minutes to form a thoroughly mixed dye composition. Subsequently 32% hydrochloric acid solution is applied to adjust the pH value to 7~7.5, and by performing reverse osmosis desalination approximately 30% of the lithium salt are replaced, it is then spray dried to obtain the dye composition of the present invention.

Example 2

Compositions of the Present Invention

Respectively, 70 parts dyestuff of formula (I-3), 15 parts dyestuff of formula (II-3), and 15 parts dyestuff of formula (III-3) are mixed together in a beaker, which are then stirred with a stirrer for 30 minutes to form a thoroughly mixed dye composition. After, 45% sodium hydroxide aqueous solution is used to adjust the pH value to 9~10, and at a controlled temperature range of 25~30° C. the solution undergoes hydrolysis for 60 minutes, the pH value is further adjusted to 7~7.5 with 32% hydrochloric acid solution, then by performing reverse osmosis desalination approximately 30% of lithium salt are replaced, and then it is spray dried to obtain the dye composition of the present invention.

Example 3

Compositions of the Present Invention

Respectively, 70 parts dyestuff of formula (I-2), 15 parts dyestuff of formula (II-2), and 15 parts dyestuff of formula (III-2) are mixed together in a beaker, which are then stirred with a stirrer for 30 minutes to form a thoroughly mixed dye composition. After, 32% hydrochloric acid solution is used to adjust the pH value to 7~7.5, and by performing reverse osmosis desalination approximately 30% of lithium salt are replaced, then it is spray dried to obtain the dye composition of the present invention.

Application Example

Ink Composition 1

Obtain the following weight percent ink components: 4.8% dye composition of example 1, 10% DEG, 10% DEGMBE, 7% glycerin, 1% S-465, 0.3% PROXEL-XL2, and 52.9% distilled water, respectively the components of the recipe are added in a beaker and stirred with a stirrer for half an hour, then with the use of a 0.45 μm filter paper absolutely-filtration is carried out to obtain the ink composition 1.

Application Example

Ink Composition 2

Obtain the following weight percent ink components: 5.0% dye composition of example 3, 10% DEG, 10% DEGMBE, 7% glycerin, 1% S-465, 0.3% PROXEL-XL2, and 52.7% distilled water, respectively the components of the recipe are added in a beaker and stirred with a stirrer for half and hour then with the use of a 0.45 μm filter paper absolutely-filtration is carried out to obtain the ink composition 2.

Testing Methods and Result

Comparison of Light-Fastness

The ink samples of Application Example are proceeding with printing and solubility tests, and the results are shown in table 2;

TABLE 1

| | Ink composition | | | |
|---|---|---|---|---|
| | Ink | | | |
| | Examples | | Comparatives | |
| Components | 1 | 2 | 3 | 4 |
| DYE | I = 4.8% | II = 5.0% | III = 3.7% | IV = 3.75% |
| DEG | 10% | 10% | 10% | 10% |
| DEGMBE | 10% | 10% | 10% | 10% |
| Glycerin | 7% | 7% | 7% | 7% |
| S-465 | 1% | 1% | 1% | 1% |
| PROXEL-XL2 | 0.3% | 0.3% | 0.3% | 0.3% |
| DI-water | 52.9% | 52.7% | 54% | 53.95% |
| Abs./λ max (100 ppm) | 0.149/ 592 nm | 0.149/ 598 nm | 0.148/618 nm | 0.146/573 nm |

The above Abs./λmax (100 ppm): denotes the above preparation of the ink composition having a concentration of 100 ppm (100 mg/l), and is tested with a UV test equipment for the wave length where the greatest UV absorbing wave length is λmax, and the UV aborbance of it is Abs.

DYE I represents the compound of the present invention having a —$SO_2CH\!=\!CH_2$ group (the specific compound structures are as the aforementioned I-2, II-2, III-3);

DYE II represents the compound of the present invention having a —$SO_2CH_2CH_2OH$ group (the specific compound structures are as the aforementioned I-1, II-1, III-1);

DYE III represents the dye component Duasyn Direct Black HEF-SF of CLARIANT;

DYE IV represents the dye component Bayscrip Black SP of BAYER.

Criterion for Printing Test are as Follows;

Printer: EPSONSTYLUS PHOTO 830U PRINTER,

Printing paper: PLAIN PAPER, total light-fastness testing energy 85KJ;

TABLE 2

| | Result of printing and solubility test | | | |
|---|---|---|---|---|
| | Inks | | | |
| Testing- | Examples | | Comparatives | |
| results | 1 | 2 | 3 | 4 |
| Blackness | 1.14 | 1.17 | 1.12 | 1.15 |
| Color difference-DELE | 7.2 | 5.3 | 5.1 | 21.4 |
| Light-fastness ISO | 2 | 2~3 | 2~3 | 1 |

From the result of table 2, the light-fastness from the obtained product of the present invention coincides with the in trend marketed products, plus the presented blackness achieves the average standard of the industry.

Solubility Test: at Constant Temperature 2-1. Obtaining a fixed amount of X g of dye (X represents the concentration necessary for the dye to dissolve in (g/l)), if it is to test a solubility of 100 g/l, then 15 g of dye is obtained and added to 150 cc of distilled water in a 250 ml beaker, and is stirred thoroughly with a glass rod.

2-2. On a magnetic stirrer, it is stirred thoroughly then heated to a temperature of 80° C. for 5 min with an allowed deviation of ±2° C.

2-3. After the TOYO No. 1 filter paper and the magnetic funnel are pre-wetted, it is vacuumed dry and poured into the dye tester solution immediately, then vacuumed dry.

2-4. To analyze the result, the filter paper is dried by convection in air.

The Result of the Tests are Listing as Table 3 Below;

TABLE 3

The results of solubility at constant temperature:

| | | Solubility Test | | |
|---|---|---|---|---|
| | | 200 g/L | | 300 g/L |
| | | Filterability | Filter Paper Residue | Filterability | Filter Paper Residue |
| Examples | 1 | OK | OK | OK | OK |
| | 2 | OK | OK | OK | OK |
| Comparatives | 3 | OK | OK | No Good | Plenty of dyes |
| | 4 | OK | Little residues | OK | Has residual particles |

From the result of table 3, the ink composition A and B of the present invention examples consisting solubility of 300 g/L, the result of the solubility test is better than the in trend marketed products.

| | Ink | | | |
|---|---|---|---|---|
| Test | Examples | | Comparatives | |
| Results | 1 | 2 | 3 | 4 |
| Light-fastness | 2 | 2~3 | 2~3 | 1 |
| Solubility | 300 g/L | 300 g/L | 200 g/L | 300 g/L |

From the tables above, the ink composition A and B of the present invention ink examples present both good properties such as good light-fastness and good solubility.

Although the present invention has been explained in relation to its preferred embodiment, it is to be understood that many other possible modifications and variations can be made without departing for the scope of the invention hereinafter claimed.

What is claimed is:

1. A black dyes composition for ink-jet printing inks, comprising:

(A) a compound of the following formula (I)

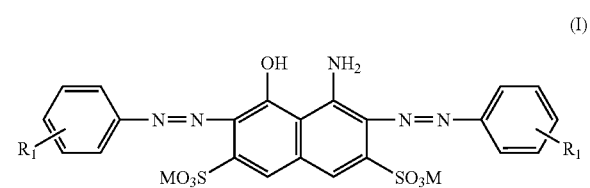

wherein
$R_1$ is —$SO_2CH=CH_2$ or —$SO_2CH_2CH_2OH$;
M is H, Na, or Li;

(B) a compound of the following formula (II)

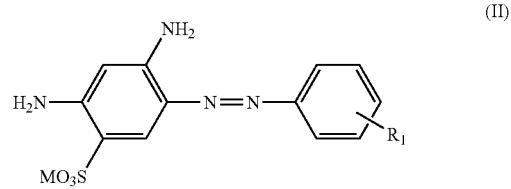

wherein
$R_1$ and M are defined as above; and (C) a compound of the following formula (III)

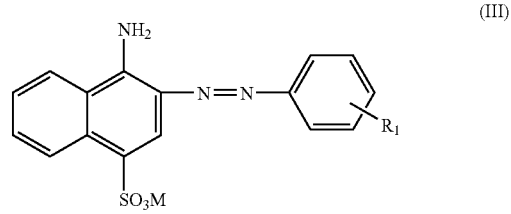

wherein
$R_1$ and M are defined as above,
wherein said $R_1$ of the formula (I) is —$SO_2CH=CH_2$ or $SO_2CH_2CH_2OH$;
wherein said $R_1$ of the formula (II) is —$SO_2CH=CH_2$ or $SO_2CH_2CH_2OH$; and,
wherein said $R_1$ of the formula (III) is —$SO_2CH=CH_2$ or $SO_2CH_2CH_2OH$.

2. The composition of claim 1, wherein the compound of formula (I) is the following formula (I-1) compound,

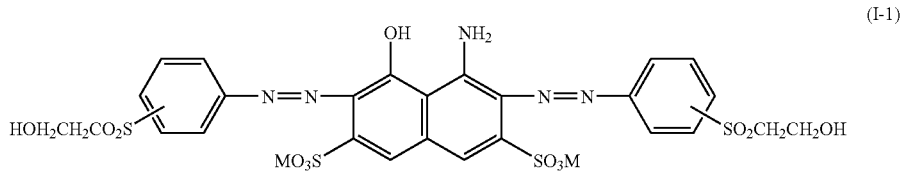
(I-1)

wherein M is H, Na, or Li.

3. The composition of claim 1, wherein the compound of formula (II) is the following formula (II-1) compound,

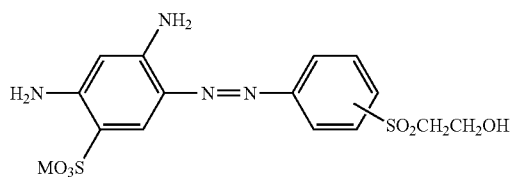
(II-1)

wherein M is H, Na, or Li.

4. The composition of claim 1, wherein the compound of formula (III) is the following formula (III-1) compound,

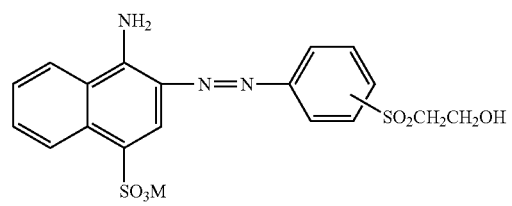
(III-1)

wherein M is H, Na, or Li.

5. The composition of claim 1, wherein said formula (I) is present in an amount of 50% to 94% by weight relative to total weight of said composition; said formula (II) is present in an amount of 3% to 47% by weight relative to total weight of said composition; and said formula (III) is present in an amount of 3% to 30% by weight relative to total weight of said composition.

6. The composition of claim 1 further comprising a component (D) organic solvent, the said organic solvent is selected from the group consisting of ethylene glycol, diethylene glycol, triethylene glycol, propylene glycol, butylenes glycol, ethylene glycol monoethyl ether, ethylene glycol monobutyl ether, diethylene glycol monomethyl ether, 2-pyrrolidone, -methyl-2-pyrrolidone, 1,3-dimethyl-2-imidazolidinone, and triethanolamine.

7. The composition of claim 6 further comprising a component (E) surfactant, the said surfactant is the compound of the following formula:

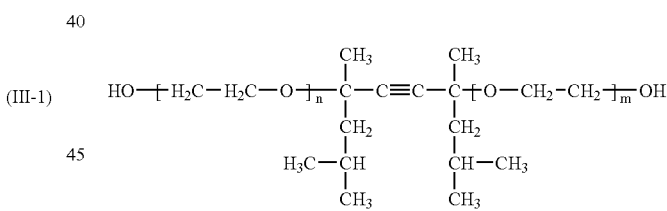

wherein the sum of n and m is an integer between 0 to 50.

8. The composition of claim 1, wherein the compound of formula (I) is the following formula (I-1),

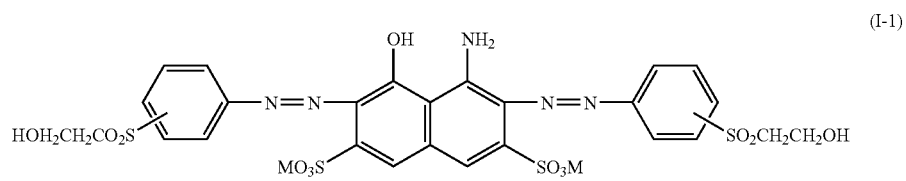
(I-1)

wherein M is H, Na, or Li; the compound of formula (II) is the following formula (II-1)

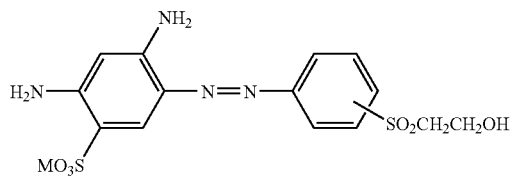
(II-1)

wherein M is H, Na, or Li; and the compound of formula (III) is the following compound of formula (III-1),

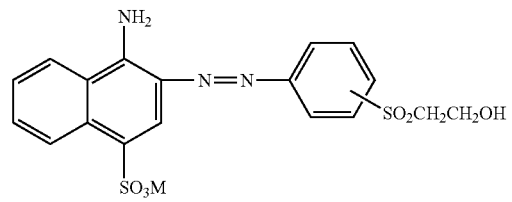
(III-1)

wherein M is H, Na or Li.

9. The composition of claim 8 further comprising a component (D) organic solvent, said organic solvent is selected from the group consisting of ethylene glycol, diethylene glycol, triethylene glycol, propylene glycol, butylenes glycol, ethylene glycol monoethyl ether, ethylene glycol monobutyl ether, diethylene glycol monomethyl ether, 2-pyrrolidone, N-methyl-2-pyrrolidone, 1,3-dimethyl-2-imidazolidinone, and triethanolamine.

10. The composition of claim 9 further comprising a component (E) surfactant, said surfactant is the compound of the following formula:

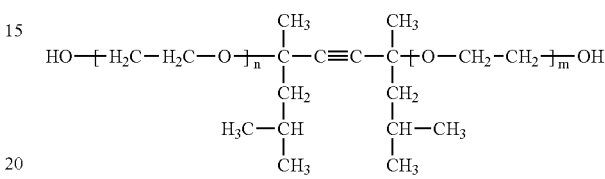

wherein the sum of n and m is an integer between 0 to 50.

11. The composition of claim 8, wherein M of the formula (I-1) is Li, M of the formula (II-1) is Li, and M of the formula (III-1) is Li.

* * * * *